(12) United States Patent
Kasapi et al.

(10) Patent No.: US 8,675,744 B1
(45) Date of Patent: Mar. 18, 2014

(54) CHANNEL TRACKING IN AN ORTHOGONAL FREQUENCY-DIVISION MULTIPLEXING SYSTEM

(75) Inventors: Athos Kasapi, San Francisco, CA (US); Sriram Sundararajan, Sunnyvale, CA (US)

(73) Assignee: ATMEL Corporation, San Jose, CA (US)

( * ) Notice: Subject to any disclaimer, the term of this patent is extended or adjusted under 35 U.S.C. 154(b) by 567 days.

(21) Appl. No.: 12/237,350

(22) Filed: Sep. 24, 2008

Related U.S. Application Data (60) Provisional application No. 60/974,768, filed on Sep. 24, 2007.

(51) Int. Cl.
*H04K 1/10* (2006.01)

(52) U.S. Cl.
USPC ........... 375/260; 375/340; 375/354; 375/346; 375/329; 370/330; 370/210; 370/203

(58) Field of Classification Search
USPC ........... 375/260, 340, 346; 370/330, 210, 203
See application file for complete search history.

(56) References Cited

U.S. PATENT DOCUMENTS

| | | | |
|---|---|---|---|
| 5,206,886 A * | 4/1993 | Bingham | 375/344 |
| 7,039,004 B2 | 5/2006 | Sun et al. | |
| 7,039,131 B2 | 5/2006 | Banerjea | |
| 7,106,709 B2 * | 9/2006 | Davidsson et al. | 370/330 |
| 7,184,495 B2 | 2/2007 | Thomson et al. | |
| 7,298,806 B1 * | 11/2007 | Varma et al. | 375/354 |
| 7,725,090 B2 * | 5/2010 | Cheng et al. | 455/192.2 |
| 2004/0228272 A1 * | 11/2004 | Hasegawa et al. | 370/210 |
| 2005/0084025 A1 * | 4/2005 | Chen | 375/260 |
| 2005/0226341 A1 * | 10/2005 | Sun et al. | 375/260 |
| 2006/0227753 A1 * | 10/2006 | Vleugels et al. | 370/338 |
| 2007/0002981 A1 * | 1/2007 | Gaikwad et al. | 375/346 |
| 2007/0058753 A1 * | 3/2007 | Saavedra et al. | 375/329 |
| 2008/0225961 A1 * | 9/2008 | Jeong | 375/260 |

* cited by examiner

*Primary Examiner* — Eva Puente
(74) *Attorney, Agent, or Firm* — Fish & Richardson P.C.

(57) ABSTRACT

A receiver determines phase and frequency information from data signals that carry information from a transmitter to a receiver, instead of or in addition to, information from control signals. In a specific embodiment, the information is obtained from data signals modulated as a binary phase-shift keying ("BPSK") waveform by demodulation. Other phase-shift keyings might be used instead. Encoded information might be recovered in received OFDM packets by receiving OFDM subcarriers modulated with the two low data rates supported by IEEE 802.11 standard(s) wherein the subcarriers encoding the packet are modulated using binary phase shift keying and the encoding information is at a zero phase or a π (pi) phase offset on each of the subcarriers. Determining the carrier frequency might be done by calculating the square of each of subcarrier signal and/or determining the phase offset of the subcarriers even with information modulated onto the subcarriers.

24 Claims, 4 Drawing Sheets

CHANNEL TRACKING IN AN ORTHOGONAL FREQUENCY-DIVISION MULTIPLEXING SYSTEM

PRIORITY INFORMATION

This application claims benefit under 35 USC 119(e) of U.S. Provisional Patent Application No. 60/974,768 filed Sep. 24, 2007, which is herein incorporated by reference in its entirety for all purpose.

FIELD OF THE INVENTION

Embodiments of the present invention disclosed herein relate generally to removing the modulation from a PSK-modulated OFDM subcarrier of a received signal and using the result for phase tracking

BACKGROUND OF THE INVENTION

Wireless systems present certain difficulties in that they are often expected to operate in adverse environments that might contain interfering signals, reflections, indoor obstructions and the like. Problems in indoor environments include the "multipath" effect and the "fading" effect. The multipath effect is where an RF (radio frequency) signal emerging from a transmitter and arriving at a receiver propagates over two or more paths of sufficiently different lengths that different frequency components of the signal experience different attenuation and phase shift. The fading effect is where the contributions of the different paths to the RF signal at the receiver add together destructively for all frequency components of the signal.

A partial solution is the partitioning of available spectrum using orthogonal frequency division multiplexing ("OFDM"), which addresses some aspects of the multipath effect and fading by using substantially simultaneous transmission of a number of narrowband subcarriers that together occupy a substantially contiguous band of the radio frequency spectrum. In a particular OFDM approach, one that has been standardized under the IEEE 802.11a standard, 52 subcarriers are used and they are distributed symmetrically in the frequency domain about a common "carrier frequency". Each subcarrier is modulated at a relatively low data rate and occupies a small bandwidth. The cumulative signal comprising all of the subcarriers is a relatively high data rate transmission whose total bandwidth is relatively large. In the case of 802.11a, it is approximately 16 MHz. The subcarriers can be modulated with binary phase shift keying (BPSK), quaternary phase shift keying (QPSK), quadrature amplitude modulation (QAM), or another keying.

In addition to begin organized into subcarriers in the frequency domain, signals in OFDM systems are distributed into symbols in the time domain. Each symbol undergoes a Fourier transform at the receiver to determine the amplitude of its subcarriers from which the encoded information is retrieved. Use of distinct symbols allows a more robust protocol. Taking advantage of the property that each subcarrier is periodic in time, with period equal to the duration of the symbol, each subcarrier can be extended by some additional fraction of its period and the overall symbol time extended so that any error at the receiver in determining the timing boundary between symbols does not result in overlap of adjacent symbols. Such a system is superior to simply leaving empty "guard intervals" between symbols, since the "cyclic extension" of the symbol subcarriers results in a simple phase shift in the frequency domain whose amplitude varies linearly with increasing subcarrier frequency.

In order to correctly recover encoded information from received 802.11 OFDM packets (e.g., 802.11a OFDM packets), the carrier frequency of each symbol should be determined. In addition, several other items should be determined, such as the linear phase shift imposed by imprecise symbol timing, the phase shift common to the subcarriers resulting from inconsistent receiver and transmitter oscillator frequencies (or imposed by bulk delay or multipath in channel propagation). These usually need to be determined with a relatively high accuracy in order to determine the baseband waveform with sufficient precision.

In order to facilitate this operation, the 802.11 OFDM protocol incorporates three techniques.

The first technique is a "short preamble", which consists of a short, known waveform repeated 16 times, which is used to roughly estimate the carrier frequency of the incoming packet by computing the relative advance in phase from one repetition of the short waveform to the subsequent repetition.

The second technique is a "long preamble" that has greater duration and contains a longer waveform and which is repeated only twice. The carrier frequency estimate made with the short preamble is refined by determining the relative phase advance from the first repetition of this longer waveform, to the next.

The third technique is the use of pilot tones, wherein certain of the subcarriers are designated as pilot subcarriers. The phase of these subcarriers is set to known "pilot" values at the transmitter and does not bear payload information. Instead, known phase in the pilot subcarriers is compared with the phase of the pilot subcarriers measured at the receiver in order to determine the phase shift common to all the subcarriers of the symbol (all relative phase shift of the entire symbol) and can be used to track any advance in phase of the received packet after the timing determined from the long preamble is determined.

Because the frequency offset determined from the short and long preambles will have some small error, and the phase is derived from the frequency offset times time, then a phase error will steadily accumulate from one symbol to the next. If the entire sequence of symbols, comprising one packet, is longer than a certain duration this accumulated phase will prevent successful demodulation of the information carried in the symbols unless it can be accurately measured and compensated for.

Under certain propagation conditions, or when the receiver radio frequency is unstable (i.e., the frequency has not settled to its final value after turn-on, or the radio is subject to large phase deviations due to low-power operation, etc.), the phase that accrues as the packet is received may drift randomly, rather than advance or move in a predictable manner as it would if it were due entirely to a small error the estimate of the packet frequency offset.

In addition, the timing of the symbols comprising an OFDM packet is determined by the frequency reference employed by the transmitter and the receiver. When these frequency references differ, the timing of subsequent symbols at the receiver will appear to drift. Since timing drift manifests itself as a phase ramp in the frequency domain, timing drift appears as a linear ramp across the subcarriers comprising a given symbol.

The use of training symbols and pilot subcarriers to track phase changes at a receiver over time is known. See, for example, U.S. Pat. No. 7,184,495 to Thomson, et al. This can be a simple operation where the receiver knows in advance what training symbols were transmitted and what was transmitted on the pilot subcarriers. In instances where the signal is accompanied in the receiver by noise, the phase determined from the amplitudes of the pilot subcarriers may be averaged together to improve the accuracy of the phase measurement. The relative increase in phase from one subcarrier to the next may similarly be estimated by fitting a single-slope line to the estimated phase of the subcarriers in sequence. These estimates improve when more pilot subcarriers are available and used.

U.S. Pat. No. 7,039,004 describes channel tracking that uses data tones, but that requires knowing the symbols and dividing the symbols out from the signal before improving the channel estimation. U.S. Pat. No. 7,039,131 describes phase offset estimation that might use data-carrying subcarrier tones.

Some techniques for timing recovery are known. See, for example, M. Oerder et al., "Digital Filter and Square Timing Recovery", IEEE Transactions on Communications, Vol. 36, No. 5 (May 1988), K. H. Mueller et al., "Timing Recovery in Digital Synchronous Data Receivers", IEEE Transactions on Communications, Vol. COM-14, pp. 516-530 (May 1976) and F. M. Gardner, "A BPSK/QPSK Timing-Error Detector for Sampled Receivers", IEEE Transactions on Communications, Vol. COM-34, pp. 423-429 (May 1986).

The number of pilot carriers allocated to the task of tracking the phase of the received packet is usually sufficient to track phase advance for signals that are received at a level high above the ambient noise level in the receiver, but for low signal levels (for instance, signals received from remote transmitters, or signals that have undergone destructive interference due to multipath propagation), the number of pilot carriers may be too small to track the changing phase and supplemental or alternative techniques might be needed.

BRIEF SUMMARY OF THE INVENTION

Embodiments of the present invention disclosed herein relate generally to determining phase and timing information from data-bearing subcarriers of OFDM symbols, instead of or in addition to, information from pilot subcarriers.

In a specific embodiment, the information is obtained from the amplitude of data-bearing subcarriers as one of two opposing phases and related to binary phase-shift keying ("BPSK"). In other embodiments, an integer power of the amplitude of the subcarrier, possibly after removing a known phase offset, is calculated, multiplying the phase of each subcarrier by two and thereby removing data modulation from a PSK-modulated OFDM subcarrier of a received signal, so that the result is twice the unknown phase being tracked. The phase might be multiplied without raising the signal to a power.

When the modulation is removed, the remaining phase is equal to the uncontrolled phase offset imposed by the channel and by uncompensated frequency offsets in the receiver, possibly plus a known phase offset. The range of applications include phase tracking in OFDM systems that use phase-shift-modulated data rates, such as an 802.11 system that uses a subset of the 802.11 data rates where the subset comprises phase-shift-modulated data rates specified for such systems.

In some embodiments, a method is provided for recovering encoded information in received OFDM symbols that includes receiving OFDM symbols, determining the subcarriers by means of Fourier transform, wherein the subcarriers are modulated with the BPSK format supported by IEEE 802.11 standard(s) wherein the subcarriers encoding the packet are modulated using binary phase shift keying and a given subcarrier of a given symbol is encoded using one of two possible phases. Other embodiments may extend this method to packets including quadrature phase keying modulation, where the information is encoded in a given subcarrier using one of four possible phases. In a more general case, the subcarriers might be modulated with a general N-ary phase-shift keying such that the receiver can perform an operation that would map disparate data signals onto each other and use the results for phase and/or timing determination at the receiver.

If there is a phase offset of the amplitude of a BPSK-modulated subcarrier of a symbol that is one of phase zero or phase pi ($\pi$) (but which of the two might not necessarily be known to the receiver) plus possibly an unknown offset, then by calculating the square of the subcarrier amplitude the BPSK modulation is removed (both phases, whether zero or $\pi$, become zero after squaring). The remaining phase is double the value of the unknown phase offset. Dividing this by two produces the unknown phase offset. If the phase of the subcarrier contains an additional, known phase offset, this is subtracted prior to determining the unknown offset.

This method can be applied to QPSK signals by calculating the fourth power of the subcarrier amplitude (or multiplying the phase by four in another manner) so that any data modulating the subcarrier amplitude is removed, and the remaining phase is four times the unknown offset plus four times any known offset. The unknown offset is then determined by dividing this phase by four and subtracting the known offset. By way of illustration, with a known offset of zero, all four phases, zero, $\pi/2$, $\pi$, and $3\pi/4$, become zero after raising to the fourth power. Other methods of multiplying the phase can be used instead of raising to a power.

This method therefore determines the unknown phase offset of a subcarrier amplitude independently of the unknown value ($0$, $\pi$, etc. . . . ) of the phase modulating the subcarrier. The determination can be based on the result of calculating, wherein both the zero phase and a or a it phase modulation produce a zero phase after the squaring step, and wherein if there is the phase offset in a subcarrier, then the phase of the squared signal is two times the offset. The method further includes averaging the phase determined by squaring one (or more) of the subcarriers to determine the phase with substantially high accuracy even if there is high noise accompanying the signal.

One benefit of the described embodiments includes the use of modulated symbols for tracking to enable relatively high accurate phase tracking methods. Typically, estimating the phase by averaging the phase the amplitude of data-bearing subcarriers provides degraded results because of the presence of the modulation, but the approaches described herein can track even using modulated subcarriers by removing this data modulation. The enhanced accuracy that results improves the immunity of the receiver to phase noise and synthesizer frequency variations, enabling the synthesizer to operate at lower power. The effective settling time of the synthesizer is also reduced, thus enabling faster power cycling of the synthesizer and therefore reducing the overall system power consumption.

Other objects, features, advantages, and benefits of the present invention will become apparent upon consideration of the following detailed description and the graphs.

DETAILED DESCRIPTION OF THE INVENTION

The present disclosure describes improved methods and apparatus for accurately determining the phase offset, distinct from phase modulation, in subcarriers of each consecutive symbol in a received packet in order to correctly recover the encoded information for orthogonal frequency-division multiplexing (OFDM) packets according, at least in part, to IEEE 802.11x standards (x=a, b, g, n, etc.).

Overview

According to embodiments of the present invention, data signals (i.e., signals that convey information to a receiver that cannot be entirely predicted in advance at the receiver) are used for phase tracking. The protocols used for conveying the data signals might vary. Examples include 802.11x signals, H-Stream protocol signals (examples of which are shown in U.S. Patent Publication 2006/0227753, published Oct. 12, 2006, which is incorporated by reference herein for all purposes) and possibly other protocols. Generally, the data signals are such that they can be used for phase estimation even if they are conveying data that the receiver does not know in advance. For example, the data signals having thereon channel and/or transmitter and/or receiver frequency timing and phase information can be transformed to be largely independent of the unknown data sent using those data signals and those transformed data signals can be used for frequency and/or phase information.

In a specific example, the data signals are OFDM signals comprising a BPSK signal on each of a plurality of OFDM subchannels, the individual subsymbols on an OFDM subchannel are mappable to phase=0 and phase=$\pi$, and the data signal is transformed by a squaring operation so that the phase=0 subsymbols transform to phase=0 subsymbols and the phases subsymbols transform to phase=$2\pi$ subsymbols. Since a phase of 0 is the same as a phase of $2\pi$, the squared signal is largely independent of the data subsymbols, in much the same way as having a signal that is encoded with subsymbols +1 and −1, namely that by squaring the signal having a phase offset thereon would convert either subsymbol to a+1 plus twice the phase offset. A DC offset might be subtracted prior to the squaring operation or the removal of any DC offset might be implicit in the squaring operation.

Note that instead of squaring the amplitude of each subcarrier, the phase of each subcarrier may be determined by direct calculation and then this phase doubled; this method is usually more computationally expensive than a squaring operation.

As used herein, unless otherwise implicitly or explicitly indicated, a subsymbol refers to that which is encoded on a subchannel in a period and a symbol is the collection of the subsymbols over the various subchannels for that period. Depending on context, the term symbol might refer to the collection of subsymbols over the information-carrying subcarriers or over the information-carrying subcarriers and pilot subcarriers (if present).

While the information borne in a subcarrier is removed by the squaring operation, a phase offset of $\theta$ (theta), comprising the sum of the unknown phase offset common and a possible known offset, is transformed to the phase offset $2\theta$ by the squaring operation. The transformed signal in the data subcarriers can be used to determine phase and/or frequency offsets alone, or using the data subcarriers and pilot subcarriers (e.g., subcarriers wherein the subsymbols transmitted are known, by convention, to the receiver in advance of receipt of those pilot subcarrier signals). Where there are more data subcarriers than pilot subcarriers, this provides more data for estimation.

If the magnitude of the phase offset is possibly larger than $\pi/2$, then there is ambiguity of $\pi/2$ in determining $\theta$ from knowledge of $2\theta$. The pilot subcarriers may be used to remove that ambiguity, such as by determining $\theta$ coarsely to within an accuracy of less than $\pi/2$ and then using that coarse estimate to select the correct $\theta$ estimate from among the ambiguous choices.

Preambles and other training sequences might also be used to provide phase/frequency information, such as at the outset of a packet transmission. However, in high-noise environments, low-power environments, or both, calculations done at the start of a packet might not be sufficiently accurate (or usable over the entire time period of the packet transmission) and thus more phase/frequency information might be needed.

The overall phase offset, $\theta$, can determined at any given time, irrespective of the data modulated onto the subcarriers, by calculating the square of each subcarrier to determine $\theta$. For IEEE 802.11x, H-Stream and other protocols that use BPSK, this provides a simple approach to phase estimation that might vary over a packet and is usable even where a limited number of pilot tone signals would not provide enough information about the channel. For example, for 802.11a, where there are 52 subcarriers, four of which are pilot subcarriers, the 48 information-carrying subcarriers can be used to estimate phase/frequency.

This can be extended beyond BPSK, such as QPSK. For QPSK, each data subcarrier might be squared twice, resulting in the fourth power of the subcarrier, from which $4\theta$ can be determined and then used for phase and timing determination.

Basic Example

Various aspects of the present invention will be described using equations and/or expressions, and it should be understood that these can be implemented in hardware and/or software and/or firmware or the like to implement a physical system or process.

Figure 1:
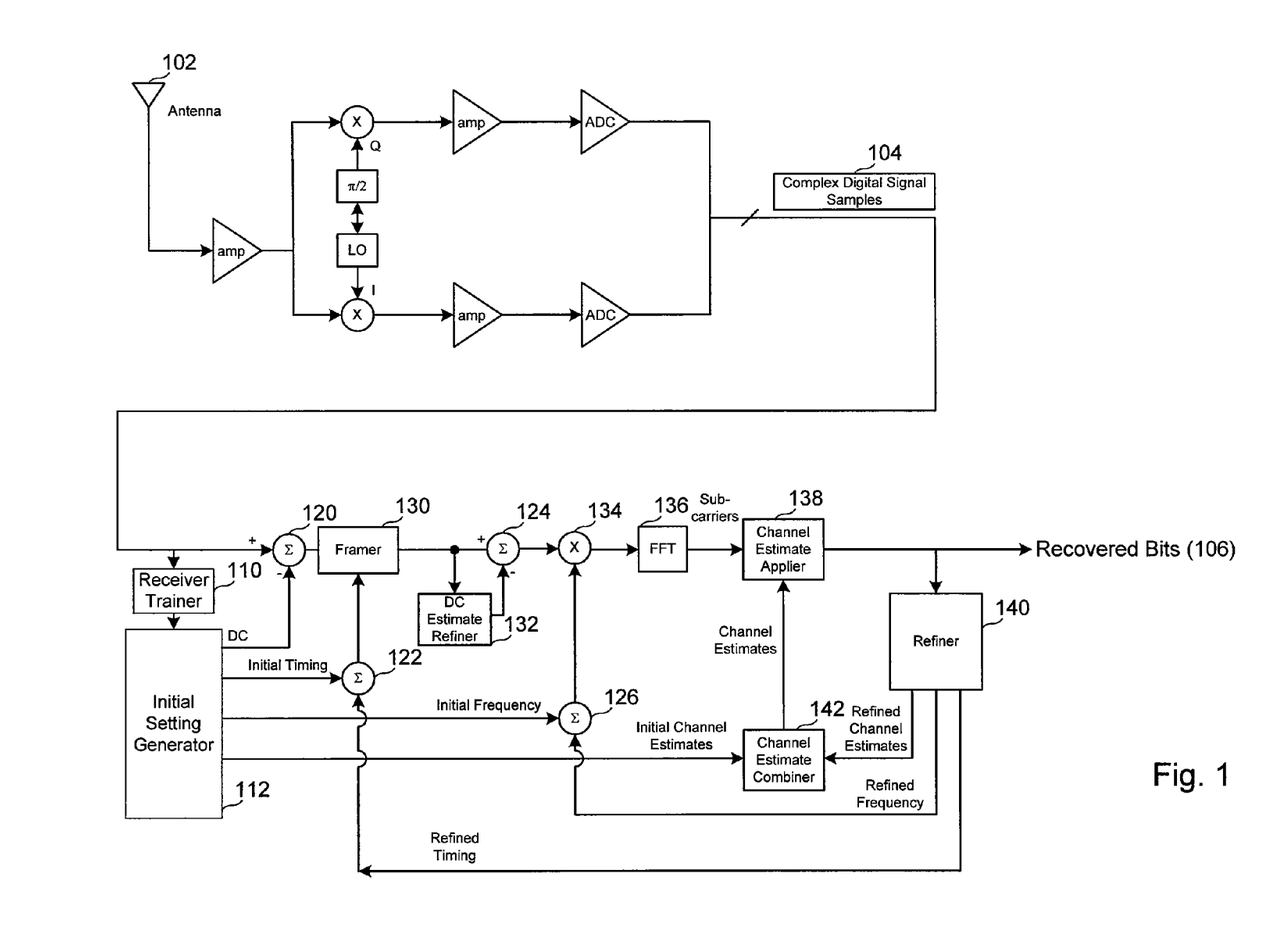
FIG. 1 is a block diagram of a receiver circuit that operates according to aspects of the present invention.

FIG. 1 is a block diagram of a receiver circuit that operates according to aspects of the present invention. Receiver circuit 100 of FIG. 1 includes an analog section that converts the received signal from an antenna 102 to complex digital signal samples 104, and a digital section that recovers the transmitted bits or information that was transmitted—the output 106 of the receiver circuit.

In the analog section, the antenna signal is provided to an amplifier, that amplifies the analog signal and provides it to a Q multiplier and an I multiplier. The I multiplier multiplies the signal with a local oscillator ("LO") oscillating at a carrier frequency (which might not be exact), while the Q multiplier multiplies the signal with the LO frequency in quadrature (offset by a quarter cycle, i.e., a phase of $\pi/2$). Each of those resulting signals are amplified and digitized by analog-to-digital converters (ADCs), resulting in complex digital signal samples 104.

On the digital side, a receiver trainer 110 processes the digital signals during a training portion of the signal (if one is present) to characterize the channel as of the training period. The channel may change over time during the data receiving period, but generally the receiver trainer 110 just trains prior to that period. Receiver trainer 110 provides information to an initial setting generator 112 that outputs initial values for a DC offset, a timing value, a frequency value and channel estimates. It should be understood that a conventional circuit for receiver training could be used here and it should also be understood that the elements described herein can be implemented as separate circuits, as firmware executed by a digital signal processor or other general purpose programmable circuit, or other approaches.

The initial values are provided to summers. In this example, an initial value for a DC offset is provided to a DC summer 120, an initial value for a timing value is provided to a timing summer 122, an initial value for a frequency value is provided to a frequency summer 126 and initial values for channel estimates are provided to a channel estimate combiner 142. These summers and combiner sum and combine values provided by a refiner 140 that refines these values during the data receiving period, as explained further herein. It should be understood that operations other than summing might be provided in place of summing the initial values and refined values.

FIG. 1 also shows a framer 130, a second DC summer 124, a DC estimate refiner 132, a frequency multiplier 134, an FFT 136 and a channel estimate applier 138. In a typical operation, the digital signal samples pass through DC summer 120, where the DC offset might be adjusted, framer 130, where symbols are organized into frames (which might be nothing more than frame boundary detection), the second DC summer 124, where the samples might be further DC offset adjusted, frequency multiplier 134, where the frequency of the samples might be adjusted, FFT 136, which transforms the samples into the frequency domain, channel estimate applier 138, where the channel characteristics that have been estimated are removed from the samples, thereby resulting in recovered bits or data 106.

As shown, DC estimate refiner 132 provides a second DC offset adjustment, based on the output of framer 130. Framer 130 relies on a timing signal estimate it receives from timing summer 122, which in turn generates its output from the initial timing and the refined timing provided by refiner 140, as described below. In some embodiments, the initial timing and the refined timing are averaged, meshed, and/or sampled, etc., instead of being summed.

Frequency multiplier 134 adjusts the frequency of the samples by applying a frequency offset obtained from summer 126, which "sums" the initial frequency offset provided by initial setting generator 112 and the refined frequency offset provided by refiner 140. Since refiner 140 operates on samples that are already adjusted by the initial values, in effect the initial values are not part of the refinement, so the feedback provided should be combined with the initial values to form the eventual adjustment.

Channel estimate applier 138 uses channel estimates from channel estimate combiner 142, which in turn combines the initial channel estimates from initial setting generator 112 and the refined channel estimates provided by refiner 140.

Thus, the circuit of FIG. 1 is one approach to having the DC offset, timing offset, frequency offset error and channel estimated during initial preamble portions of the signal and then refined. The timing offset is used to determine the timing boundary between consecutive symbols comprising the signal, and the frequency offset error is used to correct the remaining frequency offset in the signal by multiplying the signal by a complex exponential modulated at the frequency offset error rate. A Fast Fourier Transform (FFT) is calculated on each symbol to calculate the constituent subcarriers. The phase and amplitude of the subcarriers are corrected using the channel estimate to produce an estimate of the data on subcarriers originally generated in the transmitter.

In exampled described herein, the channel estimate is refined and used to correct the channel estimate, which is then applied to subsequent symbols. In addition, the frequency offset and timing offset may be refined. These processes are shown in connection with the circuit of FIG. 1 and in more detail in FIG. 2.

Figure 2:
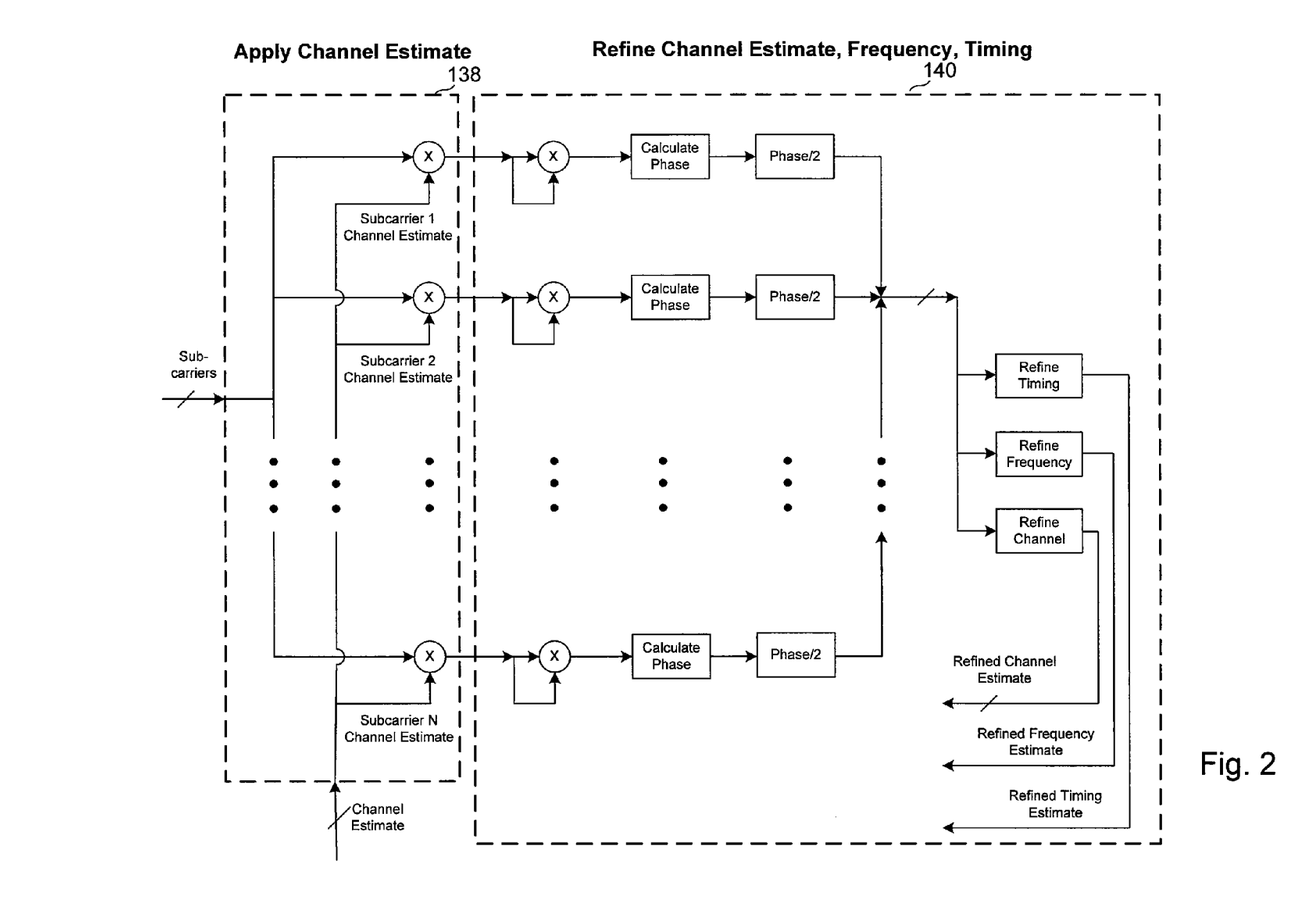
FIG. 2 is a block diagram of a portion of the receiver circuit of FIG. 1 shown in greater detail.

FIG. 2 illustrates an example of channel estimate applier 138 and refiner 140 in more detail. What follows includes a description of what happens in these and other elements. As the operations that are performed are more clearly explained with reference to the mathematical effects of the operations, that is how it is so described. However, it should be understood that these mathematical operations are carried out on the received signal using hardware, firmware, software and/or a combination and is not something that is possible or practical to perform manually.

As described above, the signal is adjusted for DC, timing, frequency and channel characteristics.

The DC offset originates from imperfections in the receiver electronics and can be a major impairment in processing the subcarriers. To address this, in these examples, the DC offset is estimated during the initial preambles and subtracted from the signal before further processing. In addition, the DC offset is re-estimated during the processing of subsequent symbols and this re-estimate is used to refine the DC offset estimate.

According to one example embodiment, BPSK data subsymbols, $d_k(n)$, are selected by the transmitter from the set of $(0, \pi)$ (and other sets for other phase-shift keying) and the value, $S_k(n)$, of the signal at the receiver for the k-th subcarrier for time period n is expressible by Equation 1.

$$S_k(n) = e^{i(d_k(n) + \phi_k(n))} + \eta_k(n) \qquad \text{(Equ. 1)}$$

Information is carried in the data portion of the phase for subcarriers k=−26, . . . , −1, 1, . . . , 26 (possibly excluding some pilot subcarriers). In Equation 1, the variable $\phi_k(n)$ represents the unknown phase offset impressed upon the signal of the k-th subcarrier by the channel and by any phase noise in the receiver, plus any known phase offset. The variable $\eta_k(n)$ represents Gaussian noise impressed upon the signal of the k-th subcarrier and is typically thermal in origin.

According to one embodiment, $\phi_k(n)$ is determined so that each of the data components $d_k(n)$ from the received subcarrier data $S_k(n)$ can be recovered with a relatively high accuracy. Where $\phi_k(n-1)$ has already been determined from processing a previous symbol in the previous symbol period n−1, a difference of phase offsets from period to period, i.e., the difference between $\phi_k(n-1)$ and $\phi_k(n)$, can then be approximated by a quantity that has a term that is constant over the k subcarriers and a term that varies linearly over the k subcarriers, representable as shown in Equation 2.

$$\phi_k(n) = \phi_k(n-1) + \Delta\Phi(n) + k\delta(n) \qquad \text{(Equ. 2)}$$

In Equation 2, $\Delta\Phi(n)$ represents the phase offset primarily due to frequency uncertainty between the transmitter and receiver secondarily due to phase noise, and $\delta(n)$ represents the slope of the phase ramp in the frequency domain due to timing uncertainty. Equations 1 and 2 can be combined to form Equation 3.

$$\phi_k(n) = e^{i(d_k(n) + \phi_k(n-1) + \Delta\Phi(n) + k\delta(n))} + \eta_k(n) \qquad \text{(Equ. 3)}$$

According to one embodiment of the present invention, the receiver determines $\Delta\Phi(n)$ and $k\delta(n)$, and then uses those determined values along with $\phi_k(n-1)$ to determine $\phi_k(n)$. Once the $\phi_k(n)$ values are known to the receiver, the $d_k(n)$ values can be determined for each subcarrier using Equation 1 and conventional or unconventional processing to solve equations, such as by determining which one of the two possible values for $d_k(n)$ make the right hand side of Equation 1 correspond most closely with the left. With ($\phi_k(n)$) determined, the subsymbols in period n+1 can be processed the same way, and so on, until all the symbols have been processed and determined.

According to the 802.11x OFDM protocol, the transmitter transmits four designated subcarriers, corresponding to k={−21, −7, 7, 21}, with values of $d_k$ that are specified by the standard, so the receiver will know what those values are and, of course, the values cannot be used by the transmitter to convey data that would be new (informative) to the receiver. With known values, it might have been contemplated that a receiver would use those predetermined subcarrier signals to calculate values for $\Delta\Phi(n)$ and $\delta(n)$ and use those calculated values in solving Equation 3 for the information-carrying subcarriers in period n.

According to one conventional process, each measured pilot subcarrier value is used for the left-hand-side of Equation 1, so that there are four equations defining $\Delta\Phi(n)$ and $k\delta(n)$. Each of these equations includes an unknown quantity for additive noise, $\eta_k(n)$, so the four equations are typically not solved exactly for $\Delta\Phi(n)$ and $k\delta(n)$, but typically a method for finding a closest-fit solution to these four equations is used.

The known quantities can be combined into a single variable, $S_k(n)$, that is defined as shown in Equation 4. This variable can be assigned to a memory location in memory within the receiver and manipulated by a processor within the receiver.

$$\tilde{S}_k(n)=S_k(n)e^{-i(d_k(n)+\phi_k(n-1))} \quad \text{(Equ. 4)}$$

Equation 4 and Equation 3 can be combined, resulting in Equation 5.

$$\tilde{S}_k(n)=e^{i(\Delta\Phi(n)+k\delta(n))}+\eta_k(n) \quad \text{(Equ. 5)}$$

The receiver that calculates the phase of each $\tilde{S}_k(n)$ can then determine a set of four linear equations of the form shown in Equation 6, where $E_k(n)$ are the error terms corresponding to the transformed noise.

$$\text{Phase}\{\tilde{S}(n)\}=i(\Delta\Phi(n)+k\delta(n))+E_k(n) \quad \text{(Equ. 6)}$$

A computationally efficient method, such as a "least squared" method, can be used to solve this set of four linear equations for the two unknowns $\Delta\Phi(n)$ and $k\delta(n)$ in the presence of the error terms. The result might not be very accurate and the process might break down when the noise, $\eta_k(n)$, becomes relatively large, causing $E_k(n)$ to become large. With more equations (i.e., more pilot subcarriers), larger values of $\eta_k(n)$ might be tolerated, but typically protocols used do not allow for more than a few subcarriers.

If the receiver is designed with an assumption that Equation 7 holds, then the receiver can use Equation 8 instead of Equation 4.

$$\Delta\Phi(n)+k\delta(n) \ll 1 \quad \text{(Equ. 7)}$$

$$\tilde{S}_k(n)=1+i(\Delta\Phi(n)+k\delta(n))+\eta_k(n) \quad \text{(Equ. 8)}$$

For the pilot subcarriers, k={−21, −7, 7, 21}, Equation 8 represents a set of four linear equations. This allows a receiver design that does not require the computationally expensive step of calculating the phase of the received subcarriers.

More Specific Examples

More specific embodiments of methods of the present invention are described in detail below, which can be implemented with the circuit of FIGS. 1-2 or with other circuits. Two specific implementations of receiver processing methods for estimating ($\Delta\Phi(n)+k\delta(n)$) are described below. Both of these specific implementations assume $d_k(n)$ is in {0, π}, but that can be generalized as described elsewhere herein. In the case of signals complying with an 802.11x OFDM protocol or the H-Stream protocol, those are the values of $d_k(n)$.

First Implementation

According to a first receiver processing method for estimating ($\Delta\Phi(n)+k\delta(n)$), each of the available subcarriers is used to solve for both $\Delta\Phi(n)$ and $k\delta(n)$. The receiver performs transformation on the values $S_k(n)$ to remove the unknown quantities $d_k(n)$ or make the signal substantially independent of those unknown quantities.

In particular, for each of the received subcarriers (e.g., 56 subcarriers in the case of 802.11 OFDM), a squared signal value, $S_k^2(n)$, is calculated; the resulting signal is represented by Equation 9.

$$S_k^2(n)=e^{2i(d_k(n)+\phi_k(n-1)+\Delta\Phi(n)+k\delta(n))}+2\eta_k(n)e^{i(d_k(n)+\phi_k(\Delta\Phi(n)+k\delta(n))}+\eta_k^2(n) \quad \text{(Equ. 9)}$$

It can be noted that $e^{2id_k(n)}=1$ because $d_k(n)$ is in {0, π}. Since that is the case, Equation 9 can be rewritten as shown in Equation 10.

$$S_k^2(n)=e^{2i\phi_k(n-1)}e^{2i(\Delta\Phi(n)+k\delta(n))}+2\eta_k(n)e^{i(\Delta\Phi(n)+k\delta(n))}+\eta_k^2(n) \quad \text{(Equ. 10)}$$

Assuming that the receiver stored the value for $\phi_k(n-1)$ from the prior symbol period, the receiver will have stored values for both $S_k^2(n)$ and $\phi_k(n-1)$, so the receiver can calculate a new value $r_k^2(n)$ represented in Equation 11.

$$r_k^2(n)=S_k^2(n)e^{2i\phi_k(n-1)} \quad \text{(Equ. 11)}$$

Using that known value of $r_k^2(n)$, the 52 equations represented by Equation 9 or 10, for each of the 52 values of k, representing the 48 information-carrying subcarriers and the four pilot subcarriers, can be reformulated as shown in Equation 12.

$$r_k^2(n)=e^{2i(\Delta\Phi(n)+k\delta(n))}+2\eta_k(n)e^{i(d_k(n)-\phi_k(n-1)+\Delta\Phi(n)+k\delta(n))}+\eta_k^2(n)e^{2i\phi_k(n-1)} \quad \text{(Equ. 12)}$$

The second term in the right-hand side of Equation 12 is the noise factor times a complex exponential, and that new noise variable can be represented as shown in Equation 13.

$$\tilde{\eta}_k(n)=\eta_k(n)e^{i(d_k(n)-\phi_k(n-1)+\Delta\Phi(n)+k\delta(n))}$$

$$\tilde{\eta}_k^2(n)=\eta_k^2(n)e^{-2i\phi_k(n-1)} \quad \text{(Equ. 13)}$$

The new noise variable $\tilde{\eta}_k(n)$ has the same variance as $\eta_k(n)$ and therefore, in that case Equation 14 is effectively the equivalent of Equation 12.

$$r_k^2(n)=e^{2i(\Delta\Phi(n)+k\delta(n))}+2\eta_k(n)+\tilde{\eta}_k^2(n) \quad \text{(Equ. 14)}$$

Using Equation 14 and the known values $r_k^2(n)$ for each of the subcarriers allows for 52 equations, i.e., those wherein k=−26, ..., −1, 1, ..., 26 so that there are 52 data points to solve for the same two unknowns, $\Delta\Phi(n)$ and $k\delta(n)$ with an additive noise term, $2\tilde{\eta}_k(n)+\tilde{\eta}_k^2(n)$, in each equation. These equations may be solved by calculating the phase of each side using well-known numerical methods, so that Equations 14 and 15 are met for a given subcarrier.

$$\text{Phase}\{r_k^2(n)\}=2i(\Delta\Phi(n)+k\delta(n))+E_k(n) \quad \text{(Equ. 15)}$$

In Equation 15, $E_k(n)$ is the error due the noise terms, $2\tilde{\eta}_k(n)+\tilde{\eta}_k^2(n)$. The set of simultaneous equations represented by Equation 15 for all of the subcarriers can be solved using least squares, or other, methods to determine $\Delta\Phi(n)$ and δ(n). Note that because the operation of taking the phase is nonlinear, these noise terms and ΔΦ(n)+kδ(n) are mixed together in the left-hand side and the first three terms on the right-hand side of Equation 15, so that $E_k(n)$ is not necessarily independent of ΔΦ(n)+kδ(n). This does not usually degrade the results significantly.

Note that if Equation 7 holds, then the numerically intensive operation of taking the phase of each side of Equation 14 may be skipped, and Equation 14 may be approximated according to Equation 16.

$$r_k^2(n) = 1 + 2i(\Delta\Phi(n)+k\delta(n)) + 2\tilde{\eta}_k(n)\tilde{\eta}_k^2(n) \quad \text{(Equ. 16)}$$

Furthermore, if the magnitude of the noise term is less than unity or assumed to be so, i.e., $|\eta_k(n)| \ll 1$ for each subcarrier, then Equation 16 can be simplified to Equation 17.

$$r_k^2(n) = 1 + 2i(\Delta\Phi(n)+k\delta(n)) + 2\tilde{\eta}_k(n) \quad \text{(Equ. 17)}$$

Equation 17 represents a set of 52 linear equations. The two unknown parameters ΔΦ(n) and kδ(n) can be determined in a least squares sense using conventional techniques well known to those of skill in the art or other techniques. With 52 linear equations (or whatever number is available under the protocol being used by the transmitter and receiver), more noise can be tolerated as compared with having only 4 or so linear equations available.

Comparing Equation 17 with Equation 8, it should be noted that, in each equation, the ratio of the quantities that are being estimated and the noise, have nearly the same signal to noise ratio ("SNR"). However, with more equations, the quantities being estimated can be estimated with relatively higher accuracy.

Second Implementation

Figure 4:
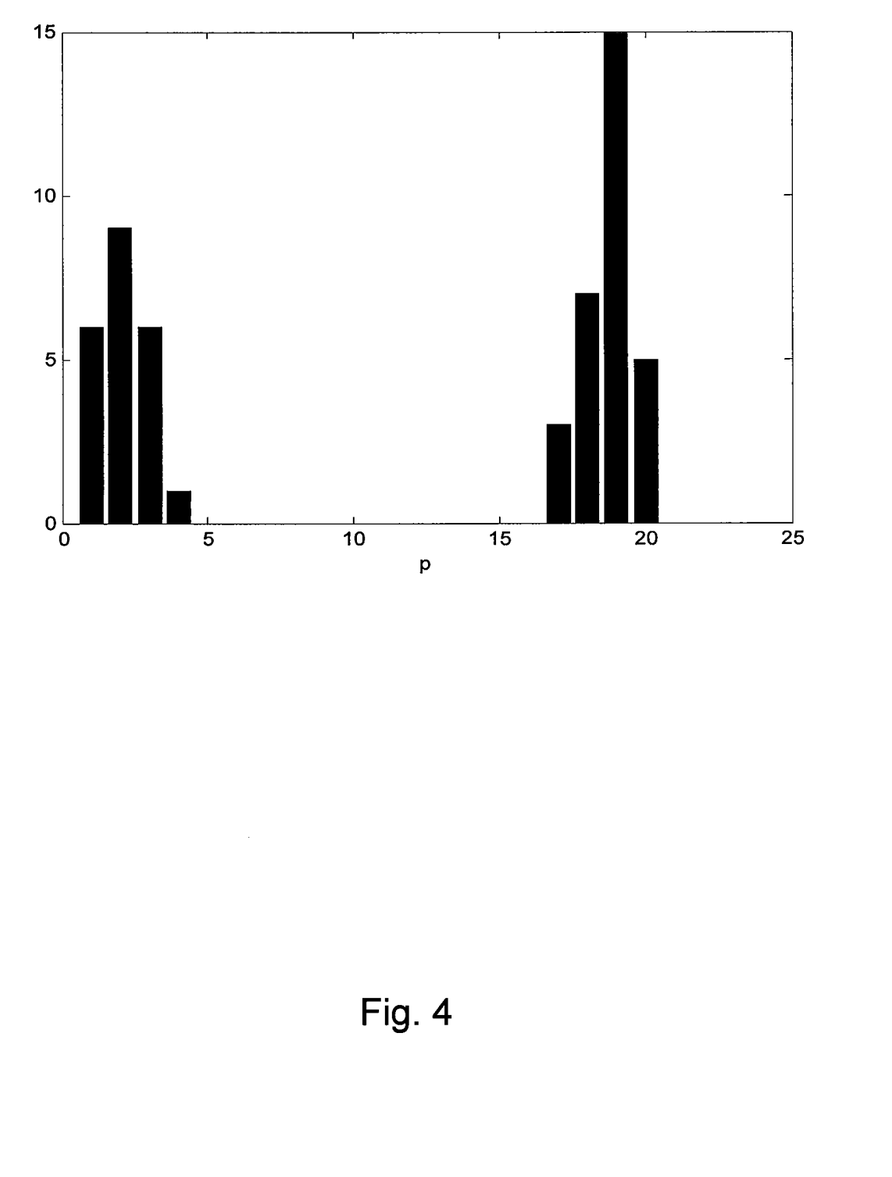
FIG. 4 is a bar graph of binning results.

According to another implementation, the equality ΔΦ(n)+kδ(n)≪1 of Equation 7 is not assumed. In such a case, using Equation 17 as an approximation of Equation 14 might not be accurate and nonlinear equations might need to be solved. In one approach, the calculation is simplified using a "binning" method, wherein the phase interval (0, 2π) is divided into N consecutive subintervals as illustrated in FIG. 4.

According to a subsequent step, a function Ξ(n, p) might be defined, wherein Ξ(n, p) is the number of subcarriers having a phase in the p-th subintervals of Equation 19. A receiver might use the Ξ(n, p) to bin the subcarriers and arrive at a set of data that is representable by a scatter plot.

Figure 3:
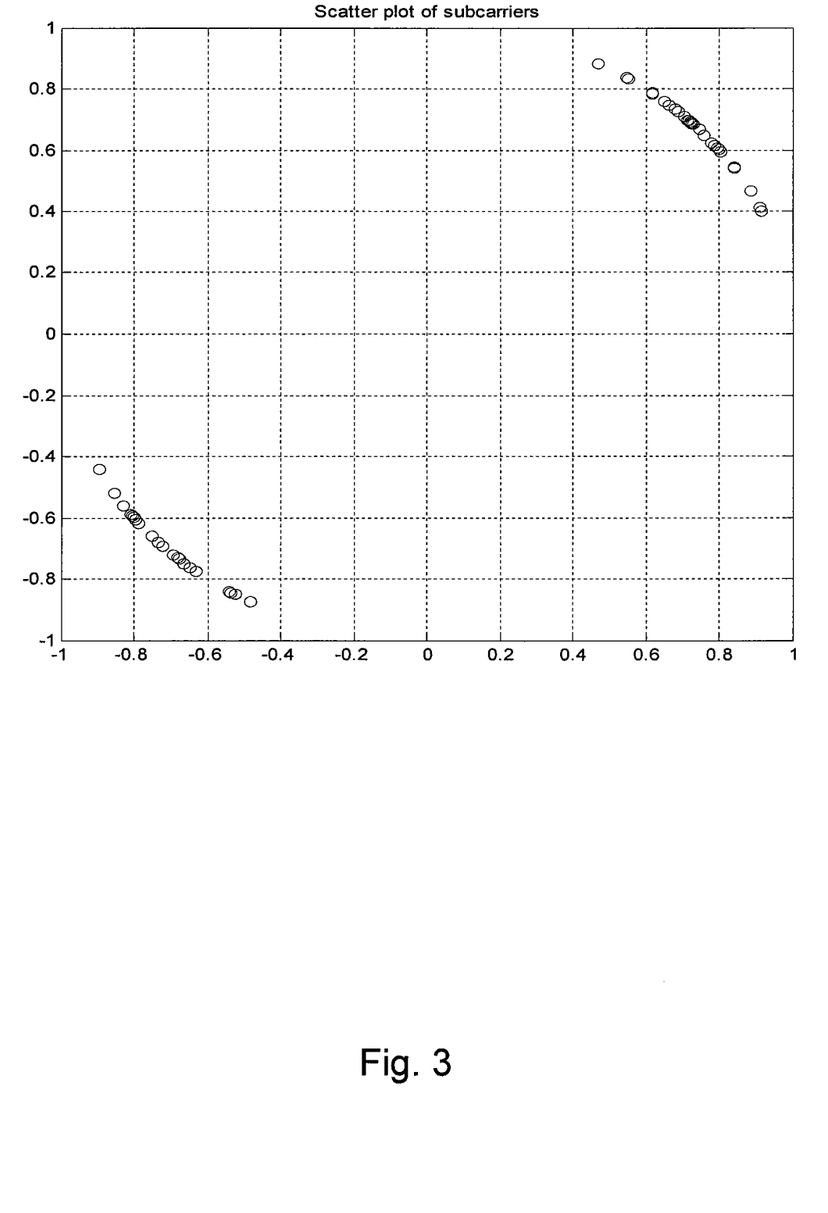
FIG. 3 is a scatter plot of phase values as might be received at the input of the receiver circuit of FIG. 1 and processed by the refiner of FIG. 1.

For example, if the set of 52 subcarriers $\tilde{S}_k(n)$, related to $S_k(n)$ by Equation 4, has a typical scatter plot for fixed n and k=−26,...,−1, 1,...,26 that looks like the scatter plot shown in FIG. 3. The corresponding plot of Ξ(n, p) as a function of p then looks like the bar graph of FIG. 4.

According to another subsequent step, a reference function $\Xi_0(n, p)$ might be defined, wherein $\Xi_0(n, p)=1$ for subinterval p=1, $\Xi_0(n, p)=1$ for subinterval p=(N/2), and $\Xi_0(n, p)=0$ for all other subintervals. The receiver can cross-correlate that reference function $\Xi_0(n, p)$ with Ξ(n, p) and conventional or unconventional processes can be used to identify one or more noisy peaks of the cross-correlation. From that cross-correlation and the identification of the noisy peak of the cross-correlation, the phase offset ΔΦ(n) can be determined with a resolution of half the interval size p/N. In this manner, the second implementation can be done, without the assumption of Equation 7.

This method can then be repeated for the subcarriers corresponding to negative values of k to determine the average phase offset, $\phi_{-13.5}(n)$, of the negative 26 subcarriers (which have an average index of −13.5), and again repeated to determine the average phase offset, $\phi_{13.5}(n)$, of the positive 26 subcarriers (which have an average index of 13.5). The difference between these two average phase offsets yields δ(n), as illustrated by Equation 18.

$$\frac{j_{13.5}(n) - j_{-13.5}(n)}{27} \cong \delta(n) \quad \text{(Equ. 18)}$$

Tracking Phase and Timing

It should be recognized that the phase and timing may drift in time and grow so large that the phase offset created across the subcarriers may, after the subcarrier signal is raised to the N-th power (or the phase multiplied by N another way) is greater than 2π. This leads to "phase wrap" wherein there is an ambiguity of 2mπ/N in determining the phase offset of the subcarrier, where m is unknown and may be any integer up to magnitude N−1.

In order to avoid this ambiguity, it is helpful to ensure that the phase measured after the subcarrier is raised to the N-th power (or the multiplied phase) is never greater than 2π so that m is always equal to one. For relatively slowly drifting phase, this can be accomplished by removing the phase most recently measured for the subcarrier before the subcarrier is raised to the N-th power (or the phase multiplied by N), so that the phase measured after that operation is just the difference accrued since the most recent measurement, and has not grown to a significant extent. However, if the phase increases rapidly from one symbol to the next, even this step may be insufficient. As explained next, pilot subcarriers may be used to improve the method.

Use of Pilot Subcarriers as Well as Information-Carrying Subcarriers

As explained above, for the case of BPSK, a phase change (ΔΦ(n)+kδ(n)) from one symbol to the next constrained to the interval (0, π) can be determined. Phase changes outside of this interval get "wrapped" back into it, which is not a problem when the phase changes are relatively slow. The allowable phase change may be extended to (0, 2π) via use of the pilot subsymbols. That is, the above methods can be used to first determine (ΔΦ(n)+kδ(n)) from one symbol to the next, and then for the set of four pilot carriers, the receiver determines which vector of the four phases of Equation 19 or Equation 20 better matches the phase increment in the received pilot subcarriers from one symbol to the next, which have approximately known values of (ΔΦ(n)+kδ(n)). Similar approaches are possible for other than BPSK.

$$\begin{bmatrix} \Delta\Phi(n) - 21\delta(n) \\ \Delta\Phi(n) - 7\delta(n) \\ \Delta\Phi(n) + 7\delta(n) \\ \Delta\Phi(n) + 21\delta(n) \end{bmatrix} \quad \text{(Equ. 19)}$$

$$\begin{bmatrix} \Delta\Phi(n) - 21\delta(n) + \pi \\ \Delta\Phi(n) - 7\delta(n) + \pi \\ \Delta\Phi(n) + 7\delta(n) + \pi \\ \Delta\Phi(n) + 21\delta(n) + \pi \end{bmatrix} \quad \text{(Equ. 20)}$$

As has now been described, OFDM communications systems that use BPSK and other phase-shift keyed can be made more robust through the use of information-carrying subcarriers, possibly in addition to training symbols in preambles and/or pilot subcarriers with known modulation values (i.e., known to the receiver in advance). A typical OFDM communication system might have a range of different modulations for different data rates with BPSK used for the lowest data rates and thus the BPSK rates are already robust relative to some of the higher rate rates and thus not need any special processing to receive the BPSK low data rate data. However, in some applications wherein the low data rates are used and the high data rates are not, the application might be limited to low SNR signals, low power devices, limited computing ability and so forth, where there is still a need for additional tracking of changing phase, timing, etc. beyond what the full protocol provides, it might be advantageous to include channel information obtained from the use of phase/timing etc. offsets of information-carrying subcarriers.

It should be apparent, after reading this description, how to apply these teachings to other than BPSK using extensions of the equations recited above.

Refinement of Frequency Offset and Timing Estimates

By using one (or more, if applicable) of the methods described above, the phase offset of each subcarrier is calculated following the application of the channel estimate, using the circuit of as FIG. 1 or another circuit or software or firmware in a digital signal processor, for example, for the specific embodiment of a receiver for OFDM BPSK. The slope of this phase offset, as a function of the subcarrier frequency, is an estimate of the timing offset and may be used to refine the timing estimate previously calculated for the signal. The linear change in the phase offsets from one symbol to the next can be used to estimate the frequency offset error in the frequency offset used in the LO of FIG. 1 and the frequency offset estimate applied as shown in FIG. 1 and as shown in more detail in FIG. 2. The timing and frequency offset estimates can be updated continuously as subsequent symbols are received. This allows a much more accurate, and more frequent, update to the timing offset and frequency offset estimates.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, rearrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. In a communications system wherein a receiver receives signals comprising a plurality of symbols, wherein each symbol is represented over a plurality of subcarriers each having distinct frequency extent and wherein an amplitude and relative phase of the subcarriers are selected by a transmitter from a predetermined set of N discrete values, where N is an integer greater than 1, and wherein reception of a signal by the receiver is subject to at least phase or timing noise and uncertainty as to one or more of phase of the signal and the timing of the symbols, a method for determining at least approximations of the phase or timing, comprising:
    receiving a symbol of the plurality of symbols, wherein the symbol comprises a plurality of components, wherein each component is represented as the signal over a distinct one of a plurality of subcarriers with each subcarrier having a distinct frequency extent, the symbol having thereon an imposed uncertainty as to one or more of phase and frequency;
    transforming the plurality of components, which have data signals carried thereon are from the transmitter and not known to the receiver in advance of receiving the components, into transformed component signals that are independent of the data signals carried on each of the components of the plurality of components, thus forming a plurality of transformed component signals each corresponding to a component of the plurality of components;
    using the plurality of transformed component signals in an estimation of the imposed uncertainty;
    transforming a given untransformed component into its corresponding transformed component by generating a signal whose phase is N times that of the phase of the given untransformed component; and
    adjusting for a known phase offset as needed, thereby converting the given untransformed component representing an unknown one of the set of N discrete values plus an unknown phase or timing offset into the corresponding transformed component whose phase is independent of the unknown value with which the given untransformed component was originally encoded but the corresponding transformed component remains dependent on the unknown phase offset or timing,
    where the method is performed by one or more hardware processors.

2. The method of claim 1, wherein N=2 and the untransformed components are encoded with either a phase of zero or a phase of $\pi$.

3. The method of claim 1, wherein each symbol is a symbol complying with an orthogonal frequency division modulation protocol.

4. The method of claim 3, wherein the orthogonal frequency division modulation protocol is an IEEE 802.11 or IEEE 802.16 protocol.

5. The method of claim 3, wherein the orthogonal frequency division modulation protocol is an H-Stream protocol.

6. The method of claim 1, wherein the plurality of subcarriers comprise 52 information-carrying subcarriers.

7. The method of claim 1, wherein using the plurality of transformed components in an estimation of the imposed uncertainty comprises averaging a phase offset determined for one or more of the plurality of transformed components, wherein an averaged phase offset is used as a representation of an uncertain phase.

8. The method of claim 7, wherein the predetermined set of possible values comprises the set of N discrete values, each having a distinct phase, where N is an integer greater than 1, and wherein the averaged phase offset is subtracted from a known phase offset common to the plurality of subcarriers, and then the result is divided by N prior to being used as the representation of the uncertain phase.

9. The method of claim 7, wherein the predetermined set of possible values comprises a set of N discrete values, each having a distinct phase, where N is an integer greater than 1, and wherein the uncertain phase is disambiguated between possible phase offsets 2mπ/N by comparing phase offset error of pilot subcarriers with previously estimated phase and timing of these subcarriers to determine which possible phase offset among 2mπ/N possible phase offsets yields a preferred correspondence for some integer M.

10. The method of claim 1, wherein the predetermined set of possible values comprises a set of N discrete values, each having a distinct phase, where N is an integer greater than 1, and wherein using the plurality of transformed component signals in an estimation of the imposed uncertainty comprises calculating a relative change in phase offset among two or more of the plurality of subcarriers, followed by dividing the relative change by N.

11. The method of claim 10, wherein the estimation comprises fitting the calculated relative change in phase offsets taking into account known offsets and impositions on the signal, wherein the fitting is a fitting to a linear approximation that is usable as the representation of the uncertain symbol timing.

12. In a communications system wherein a receiver receives a signal according to an orthogonal frequency division modulation protocol defining a plurality of information-carrying subcarriers, and wherein the signal encodes information in symbols or subsymbols selected from a predetermined set of N discrete values, where N is an integer greater than 1, and wherein reception of a signal by the receiver is subject to noise and uncertainty as to one or more of phase of the signal and the timing of the symbols, a method for determining at least approximations of the phase and/or timing, comprising:

receiving data signals representing a plurality of information-carrying subcarriers having thereon imposed uncertainties as to one or more of phase and timing, the plurality of information-carrying subcarriers carrying information in that the data signals carried thereon are from the transmitter and not known to the receiver in advance of receiving the information-carrying subcarriers;

compensating signals for phase and timing error estimated over previously received portions of the signals to form compensated signals;

transforming the compensated signals into a plurality of transformed signals that are independent of the information carried on the plurality of information-carrying subcarriers, thus forming a plurality of transformed component signals each corresponding to a subcarrier;

using the plurality of transformed component signals at the receiver in an estimation of one or both of an error between the imposed uncertainties and the phase estimated over previously received portions of the signal or an error between the imposed uncertainties and the timing estimated over previously received portions of the signal;

transforming a given untransformed compensated signal into its corresponding transformed component signal by generating a signal whose phase is N times that of the phase of the given untransformed compensated signal; and adjusting for a known phase offset as needed, thereby converting the given untransformed compensated signal representing an unknown one of the set of N discrete values plus an unknown phase or timing offset into the corresponding transformed component signal whose phase is independent of the unknown value with which the given untransformed compensated signal was originally encoded but the corresponding transformed component signal remains dependent on the unknown phase offset or timing, where the method is performed by one or more hardware processors.

13. The method of claim 12, wherein N=2 and the untransformed compensated signals are encoded with either a phase of zero or a phase of π.

14. The method of claim 12, wherein each symbol is a symbol complying with an orthogonal frequency division modulation protocol.

15. The method of claim 12, wherein the orthogonal frequency division modulation protocol is an IEEE 802.11 protocol.

16. The method of claim 12, wherein the orthogonal frequency division modulation protocol is an H-Stream protocol.

17. The method of claim 12, wherein the plurality of information-carrying subcarriers comprise 52 information-carrying subcarriers.

18. The method of claim 12, wherein using the plurality of transformed component signals in an estimation of the imposed uncertainty comprises averaging a phase offset determined for each one or more of the plurality of transformed component signals, wherein the averaged phase offset is used as a representation of the uncertain phase.

19. The method of claim 18, wherein the predetermined set of possible values comprises a set of N discrete values, each having a distinct phase, where N is an integer greater than 1, and wherein the averaged phase offset is divided by N prior to being used as a representation of the uncertain phase.

20. The method of claim 18, wherein the predetermined set of possible values comprises a set of N discrete values, each having a distinct phase, where N is an integer greater than 1, and wherein determination of the uncertain phase is made between possible phase offsets 2mπ/N, for some integer m, by comparing a phase offset error of pilot subcarriers with previously estimated phases and timing of these subcarriers to determine which possible phase offset among the 2mπ/N possible phase offsets yields a preferred correspondence.

21. The method of claim 12, wherein the predetermined set of possible values comprises a set of N discrete values, each having a distinct phase, where N is an integer greater than 1, and wherein using the plurality of transformed component signals in an estimation of the imposed uncertainty comprises calculating a relative change in phase offset among two or more of the plurality of subcarriers, followed by dividing the relative change by N.

22. The method of claim 21, wherein the estimation comprises fitting the calculated relative change in phase offsets taking into account known offsets and impositions on the signal, wherein the fitting is a fitting to a linear approximation that is usable as a representation of the uncertain symbol timing.

23. In a communications system wherein a receiver receives a signal comprising K subcarrier signals each having a distinct frequency extent and each encoding a data symbol selected by a transmitter from a predetermined set of N distinct phase values, wherein K and N are both integers greater than one and at least some of the data symbols selected are not known to the receiver in advance of reception of those data symbols, each of the K subcarrier signals including at least phase or timing noise and uncertainty as to one or more of phase of the signal, frequency of the signal and the timing of the data symbol, a method for determining at least approximations of the uncertainty, comprising:

receiving the K subcarrier signals, having thereon imposed the uncertainty as to one or more of phase of the signal, frequency of the signal and the timing of the data symbol;

transforming the K subcarrier signals, which have data signals carried thereon selected by the transmitter and not known to the receiver in advance of receiving the components, into K transformed component signals, wherein a given transformed component signal is independent of the data signals carried in its corresponding subcarrier signal, but still containing at least some of the imposed uncertainty, and wherein the transforming of the K subcarrier signals into the K transformed component signals includes multiplying a phase of each of the K subcarrier signals by N, thereby resulting in a phase that is N times a phase uncertainty, but is independent of the encoded one of the set of N distinct phase values;

dividing the phase of each of the K subcarrier signal by N, thereby resulting in the K transformed component signals; and using the K transformed component signals in an estimation of the imposed uncertainty, where the method is performed by one or more hardware processors.

24. The method of claim 23, wherein K=48 and N=2, the set of N distinct phase values are zero and $\pi$, and wherein multiplying the phase of a subcarrier signal comprises multiplying the subcarrier signal by itself.

* * * * *

UNITED STATES PATENT AND TRADEMARK OFFICE
CERTIFICATE OF CORRECTION

| | | |
|---|---|---|
| PATENT NO. | : 8,675,744 B1 | Page 1 of 1 |
| APPLICATION NO. | : 12/237350 | |
| DATED | : March 18, 2014 | |
| INVENTOR(S) | : Athos Kasapi et al. | |

It is certified that error appears in the above-identified patent and that said Letters Patent is hereby corrected as shown below:

In the Specification:

Column 1, Line 17: delete "tracking" and insert --tracking.--.

Column 4, Line 38: delete "zero phase and a or a it phase" and insert --zero phase and $\pi$ phase--.

In the Claims:

Column 15, Line 1: delete "wherein the" and insert --wherein an--.

Column 15, Line 38: delete "from the" and insert --from a--.

Signed and Sealed this
Twelfth Day of August, 2014

Michelle K. Lee
*Deputy Director of the United States Patent and Trademark Office*